Oct. 12, 1943.  E. O. CARMODY  2,331,303
SYNTHETIC FLIGHT TRAINER
Filed Dec. 26, 1942  2 Sheets-Sheet 1
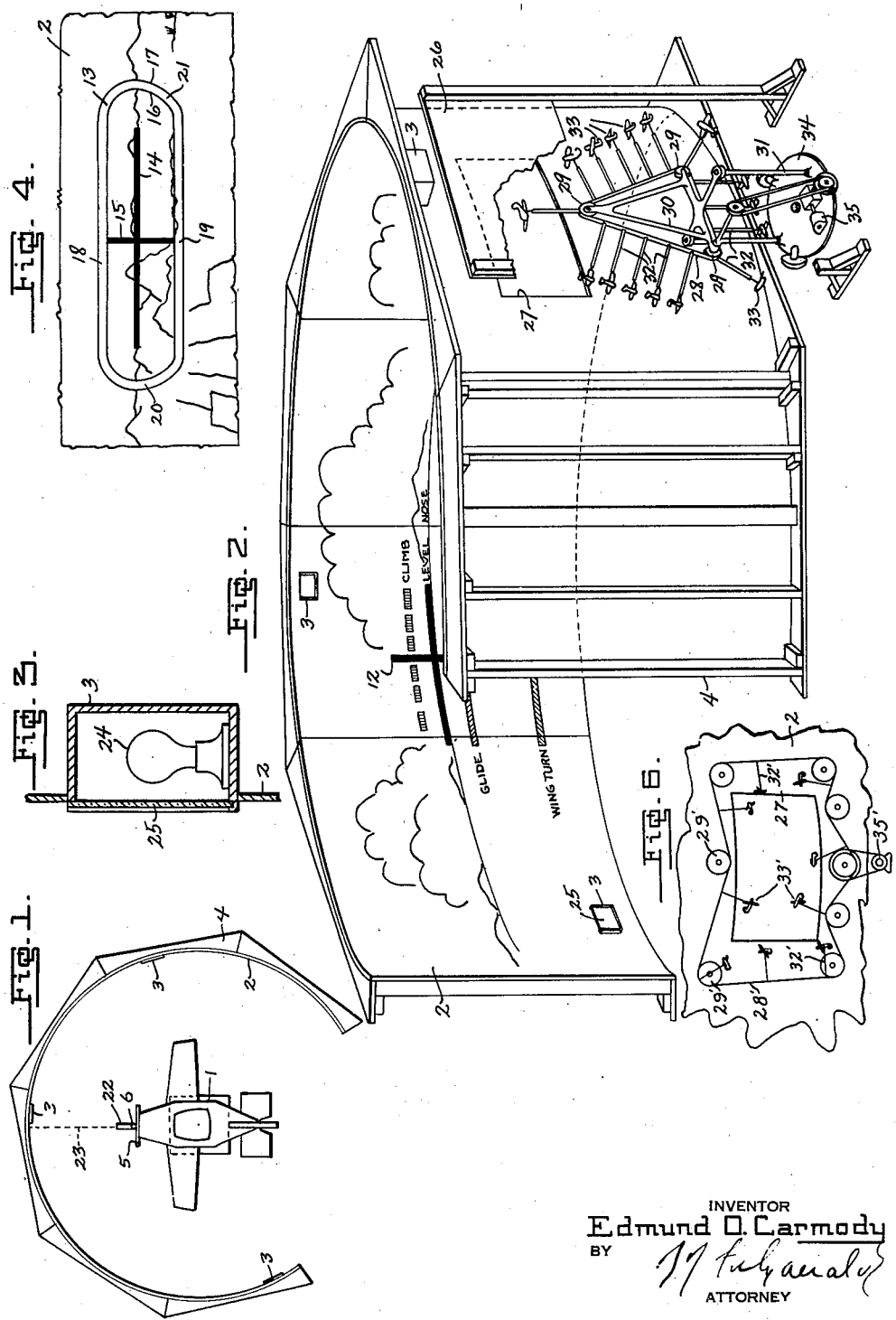
INVENTOR
Edmund O. Carmody
BY
ATTORNEY Oct. 12, 1943.   E. O. CARMODY   2,331,303
SYNTHETIC FLIGHT TRAINER
Filed Dec. 26, 1942   2 Sheets-Sheet 2
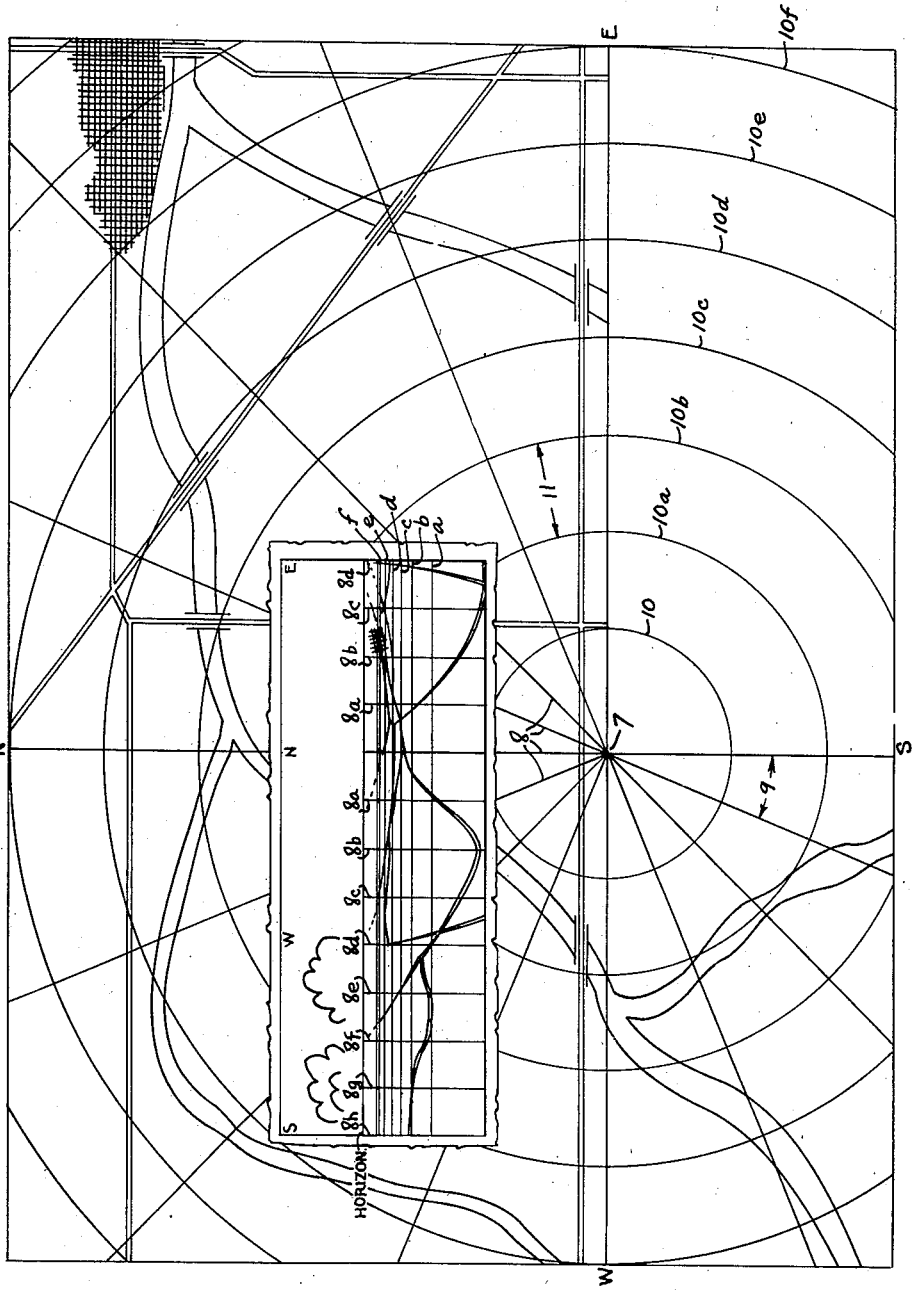
INVENTOR
Edmund O. Carmody Patented Oct. 12, 1943

2,331,303

UNITED STATES PATENT OFFICE 2,331,303

SYNTHETIC FLIGHT TRAINER

Edmund O. Carmody, United States Navy

Application December 26, 1942, Serial No. 470,269

9 Claims. (Cl. 35—12)

(Granted under the act of March 3, 1883, as amended April 30, 1928; 370 O. G. 757)

The subject of the present invention is synthetic flight training apparatus to be used in connection with any type of flight trainer cockpit unit.

The object of this invention is to provide a screen around the trainer which shows a panoramic view presented to the student in the cockpit in such manner as to simulate an actual view of some territory over which he may be flying.

A further object is to lay out guide markings on portions of this screen to facilitate teaching the student to orient his plane in various normal attitudes for different maneuvers.

A further object is to provide means whereby images of aircraft normally invisible may be flashed by the instructor on various portions of the screen to test the student's alertness of observation of any enemy craft that might suddenly appear from unforeseen places such as from behind cloud banks or terrestrial obstructions and also to break the student's tensity with respect to his controls.

A further object is to provide an aperture or cut out portion in the screen with a backdrop similarly lighted as the screen and filled in to blend into the scene around the cut out on the screen, thus providing a space between the screen and backdrop where mechanism may be mounted for displaying plane models controlled so that the models may climb, glide or bank and may cross the aperture from and at any desired angle to provide training in either fixed or free gunnery, and identification.

A further object is to lay out a track tracing the direction in which the nose of the student's plane is to follow in order to give the student practice in controlling the plane and making it follow a designated course by means of the corresponding necessary maneuvers.

A further object is to provide a basis for an artistic panorama representing any typical or designated actual territory including landscape, seascape and sky in which it is desirable to locate the student's plane.

Further and more specific objects of this invention will become apparent as the description of some illustrative forms of this invention proceeds. These forms are illustrated in the accompanying drawings, in which, Fig. 1 is a plan view of the apparatus in general.

Fig. 2 is a perspective view of the screen, showing some of the makings and exemplary locations for the invisible identification boxes whereby the images of aircraft are flashed.

Fig. 3 is a detail section of one of these boxes.

Fig. 4 is an illustration of a track tracing the path of the nose of the student's aircraft covering a series of typical maneuvers for practice purposes; and Fig. 5 illustrates the method whereby a basis for a panorama is laid out on the screen to represent a certain territory by means of a system of coordinates taken from the map of the territory and to be reproduced on the screen.

Fig. 6 is a diagrammatical illustration of an irregular track which may be used for guiding the airplane models in irregular paths within the screen opening in front of the backdrop.

Similar numerals are used to designate the same parts in the several views of the drawings.

In Fig. 1, 1 is the trainer cockpit unit, 2 is the screen, 3 are the aircraft identification boxes, 4 is the framework on which the screen is mounted, 5 is a horizontal reference bar on the nose of the student's plane, and 6 is the vertical reference bar whereby he is enabled to orient his plane with reference to the guide markings and the horizon on the screen.

The screen 2 may be made up of an artistic painting or sketch or mosaic photographs to represent a typical or an actual portion of a territory over which it is desired to locate the student's plane by a method of coordinates laid out on the map or sketch of the territory and reproduced on the screen.

The student's location 7 (Fig. 5) is designated on the map in the desired position. From this point a series of radii 8, 8, etc. is laid off at some regular angular interval 9, also a series of circles 10, 10, etc., is struck from this point as a center and having radii varying by a certain interval 11, the smallest circle representing the base of a cone formed by the student's line of sight to the base of the screen as a generatrix.

These lines form the coordinates on the map which are represented on the screen by rectangular coordinates, located as follows:

The screen is shown in Fig. 5 as being a development thereof with the directional lines N., S., W. and E., as shown. The base line of the screen represents the development of the smallest circle on the map. The first horizontal line $a$ above the base line is marked off on the screen to represent the intersection of the cone having a base represented by the circle 10a next to the smallest circle on the map struck by a generatrix which follows the student's line of sight to that circle with the vertical cylinder formed on the smallest circle. The second horizontal line $b$ represents a similar intersection of the vertical cylinder by a cone formed by the generatrix following the student's line of sight to the third circle 10b, the third horizontal line c, the fourth circle 10c, etc., as far as desirable. The vertical line marked N. represents the intersection of the vertical cylinder by a vertical plane passed through the student's position and the true North. Then, at intervals equal to the arcs struck by the consecutive radii, vertical lines are laid off at 8a, 8b, etc., to each side of the N. line on the screen to represent corresponding intersections of the cylinder by the several vertical planes passing through the consecutive radii 8, 8, etc., marked off on the map or sketch.

The above system may be modified by laying off equal rectangles on the screen by spacing the horizontal lines equally at any suitable interval from the base line to the horizon, then finding the radius of the circle on the map which each of these horizontal lines represents. By drawing the corresponding circles on the map the portions of the terrain may be accordingly divided into sections and transferred from each section on the map to the corresponding rectangle on the screen.

Having these rectangular coordinates marked off on the screen, an artist may readily fill in the panoramic view of the territory covered by the corresponding series of coordinates on the map or sketch by taking each individual rectangular space and painting or otherwise filling in the corresponding portion of the territory as it would appear to the observer from the point 7 on the map, thus joining the view between the rectangular spaces so as to form one continuous and realistic panorama when the screen is properly spaced around the trainer. The space above the horizon may obviously be filled in by characteristic celestial views and the enclosure may be continued to form a dome or canopy to portray the sky overhead if desired.

With a panoramic view of this type the student may readily imagine himself being in the open in actual flight and above the designated territory, and may therefore readily subject himself to the same feeling as though he were actually on a practice flight, without incurring the possibility of accident involving serious damage to himself and the plane.

Obviously the screen may be made to represent several different types of scenery and/or weather conditions when looking in different directions.

Portions of it may represent a low ceiling with the student flying in the clouds for practice in blind flying, etc.

To enable the student to orient his plane in the proper attitude for going through various maneuvers such as gliding, climbing, or producing the proper bank during turns of various degree, a set of reference lines are superimposed upon one portion of the screen. These consist of (1) a vertical black line 12 for directional reference, (2) a solid black horizontal line representing the horizon and serving as a guide to level flight, labeled "level nose," (3) a red horizontal line above, but parallel to the black horizontal line to be labeled as "climb;" (4) a green horizontal straight line below, and parallel to, the horizon labeled "glide," and (5) a brown horizontal straight line below the glide line labeled "wing turn." This last line represents the level to which the end of the wing should be lowered when viewed from the cockpit during a turn in order to secure the proper bank under normal conditions.

At another portion of the screen reference lines for a coordinaton exercise are superimposed on the panoramic landscape and located on the screen 180° from the other set of reference lines. A double line track 13 is traced in such a form about a pair of intersecting lines, one 14 representing the horizon, the other 15 being vertical, so as to trace the direction in which the nose is pointed during a practice flight, including maneuvers such as turning, climbing, gliding, etc. The student, by manipulating his controls so as to maintain the nose of the plane pointed between these lines 16 and 17 as he follows this track, executes a flight corresponding to the practice flight represented by this track and the instructor may thereby check the student's maneuvers in following this course to see if they are properly performed; in other words, in following a particular course during which it is necessary to make turns while either climbing or gliding, etc., the controls have to be used correctly in order to execute the proper maneuvers to follow the designated course.

The track has an upper horizontal portion 18 at the "climb" level and a bottom horizontal portion 19 at the "glide" level. These portions are joined by curved end portions 20 and 21. The student "flies the plane" so that the projection of his line of sight through the intersection of the reference bars on the nose of the cockpit does not move outside of this track. To enable the instructor to check on his proficiency in these maneuvers, a hooded light 22 mounted on the nose of the cockpit may be made to project a spotlight on the screen at a point corresponding to that in line with the student's line of sight above referred to. By observing the path of this spotlight with reference to the track on the screen the instructor as well as the student himself are enabled to judge the proficiency of the student in guiding his plane through the prescribed maneuvers of making smooth climbing and gliding turns and getting into and out of them on coming to a designated direction.

In place of the hooded light 22 on the nose of the cockpit throwing a beam 23 on the screen, the track between the lines could be lighted up so as to effect a hooded photo-electric cell on the nose of the plane whenever the nose was lined up therewith, and a signal could be arranged to show the instructor when the student was on or off the track.

At various points on the screen or above the student there are positioned aircraft identification boxes 3. Those on the screen being made flush with the screen and covered by paint so as to blend into the scenery when not lighted. Flashlights behind the screens of these boxes produce an image of the aircraft when lighted. The lights are controlled by the instructor selectively, to illustrate the sudden appearance of an actual plane at unexpected places. The student is urged to be on the lookout for any such appearances of strange aircraft and to identify them so as to prepare him for actual maneuvers in time of war and cause him to be alert, as well as to enable him to become supple and at ease in his maneuvers. The result of constantly looking around for the possible appearance of aircraft in all directions, to the sides as well as to the rear, upwardly and downwardly, while maintaining his plane on an even keel or on a designated course, enables the student to overcome any tendency to "freeze" his control grips and relaxes his muscles so as to make him more supple in his controls. This exercise tests the ability of the student to divide his attention from piloting to spotting of other aircraft as well as relaxes him by causing him to turn his head and shoulders and move his body in order to spot aircraft that might appear below him or in any other direction. In this way he gets used to controlling the plane with natural ease and with least exertion, while being constantly on the alert.

These identification boxes may be made as follows:

A box (Fig. 3) is made to contain an ordinary light bulb 24 and a screen 25 is made of a piece of window glass to cover the box. The window glass is sand blasted on one side. An area of masking tape is laid out on the side of the glass that has been sand blasted. A design of an aircraft is drawn on the tape. The outlines of the design are then cut around with a stencil knife and all the tape except that which makes up the actual design is removed. Sufficient lines are cut in the design to clarify its true shape and identity, then flat black lacquer is sprayed over the uncovered portions of the glass. When the lacquer is set, the design pattern of tape is removed. The glass is then turned over and on the clear, smooth side the same color of paint as the background into which the identification box is merged, is lightly sprayed. It is to be noted that it is best to remove the tape before the lacquer is thoroughly dry because the lacquer has a tendency to soften the tape, and if allowed to dry thoroughly it is almost impossible to get off without fraying the edges of the design.

A further means which may be provided in connection with the above apparatus to give the student practice in airplane identification as well as fixed and free gunnery is a backdrop 26 to fill in the background behind a cutout portion of the screen such as shown at 27. In between the cutout and the backdrop a mechanism is positioned to cause various airplane models to travel across the backdrop portion presented to the student's view at various angles and in various attitudes and directions. One of such devices is illustrated in Fig. 2. A band 28 is made to be driven over three pulleys 29 mounted on a spider 30 fastened to a vertical rotatable standard 31. A series of detachable rods 32 are mounted on the periphery of the band. The sample airplane models 33 may be attached to the ends of these rods. The standard is geared to rotate slowly as the band is rotated to sweep the models successively by the backdrop so that the same model sweeps by the backdrop in a different direction each time it comes up, thus presenting itself to the student in different views. In this manner the student may be enabled to study and identify aircraft regardless of what view of them he may be able to obtain. Actual conditions are thus better represented also for gunnery practice.

In connection with practice in gunnery various known methods of determining hits, etc., may be used and will therefore not be discussed here. Among these, the hinging of the targets so they will fall back when hit, or some electric signal operated by photocell equipment in the gun barrel and on the target, may be mentioned.

A small electric motor 35 may be mounted in the base 34 of the model presenting mechanism to furnish the necessary power to drive both the band and the standard through suitable gearing.

A modification of the mechanism for presenting the models to the student's view is a mechanism (Fig. 6) including an irregular track mounted about the cut-out portion back of the screen having one or more trolleys mounted to follow said track, each having a rod thereon extending inwardly of the track with a model mounted on the end of the rod, the track being so formed that during portions of the travel of the trolley around the track, the model will appear in the cut-out portion of the screen and will follow an irregular path in front of the backdrop. Means are provided to pull the trolleys along the track at an appropriate speed. A band 28' may be made to pass around pulleys 29' to form the irregular path along which the rods 32' with the plane models 33' are carried as shown in Fig. 6. The band is driven at a suitable speed by the motor 35'.

Various changes in design and arrangement may be made without departing from the scope of this invention, which is covered by the appended claims.

This invention may be used by or for the Government of the United States for governmental purposes without the payment to me of any royalty thereon or therefor.

What is claimed is:

1. In combination with a synthetic flight trainer, a screen surrounding said trainer pictorially presenting to the student in the cockpit of the trainer an outside scene from an altitude simulating a view of the surrounding territory as it would appear to an occupant of a plane in the air, and reference lines superimposed on a portion of said screen and reference means on the trainer to enable the pilot to place the trainer in the proper attitude for various normal flying maneuvers.

2. In combination with a synthetic flight trainer, a screen surrounding said trainer pictorially presenting to the student in the cockpit of the trainer an outside scene from an altitude simulating a view of the surrounding territory as it would appear to an occupant of a plane in the air, and a double-line reference track superimposed on a portion of said screen for the student to practice following with the nose of the trainer accompanied by the proper operation of the controls to put the plane through the corresponding attitudes necessary for the execution of the practice flight resulting from following said track.

3. In combination with a synthetic flight trainer, a screen surrounding said trainer pictorially presenting to the student in the cockpit of the trainer an outside scene from an altitude simulating a view of the surrounding territory as it would appear to an occupant of a plane in the air, and a double-line reference track superimposed on a portion of said screen for the student to practice following with the nose of the trainer accompanied by the proper operation of the controls to put the plane through the corresponding attitudes necessary for the execution of the practice flight resulting from following said track, which includes horizontal portions at different levels involving climbing and gliding turns, joined by curved end portions involving coming out and going into said turns.

4. In combination with a synthetic flight trainer, a screen surrounding said trainer pictorially presenting to the student in the cockpit of the trainer an outside scene from an altitude simulating a view of the surrounding territory as it would appear to an occupant of a plane in the air, and means for flashing images of aircraft on the screen and above and below the student, normally invisible, for identification practice and to test and increase the student's ability to divide his attention between controlling his plane and spotting aircraft appearing suddenly in unexpected places as well as to give him practice in relaxing his grip on the controls so that he may more readily learns to fly at ease.

5. In combination with a synthetic flight trainer, a screen surrounding said trainer pictorially presenting to the student in the cockpit of the trainer an outside scene from an altitude simulating a view of the surrounding territory as it would appear to an occupant of a plane in the air, a cut-out portion in said screen, a backdrop behind said cut-out portion similarly lighted and blending into the adjacent scenery on the screen, and means for presenting models of aircraft moving across said opening between the screen and the backdrop simulating the appearance and flight of said aircraft in the distance at various angles and in various directions for practicing identification, and fixed and free gunnery.

6. In combination with a synthetic flight trainer, a screen surrounding said trainer pictorially presenting to the student in the cockpit of the trainer an outside scene from an altitude simulating a view of the surrounding territory as it would appear to an occupant of a plane in the air, and a hooded light on the nose of the trainer for throwing a spotlight on the screen corresponding to the point toward which the nose is aimed, to enable the instructor to check the student's proficiency in controlling his plane to fly a designated course or in pointing the nose of his plane along a designated track while putting his plane through the corresponding maneuvers by proper operation of his controls.

7. In combination with a synthetic flight trainer, a screen surrounding said trainer pictorially presenting to the student in the cockpit of the trainer an outside scene from an altitude simulating a view of the surrounding territory as it would appear to an occupant of a plane in the air, means for lighting up the track so as to operate a photocell, a hooded photocell on the nose of the trainer responsive to said lighting when the nose is aimed at the track, and a signal visible to the instructor operated by said photocell to enable the instructor to check the student's proficiency in controlling his plane to fly a designated course or in pointing the nose of his plane along a designated track while putting his plane through the corresponding maneuvers by proper operation of his controls.

8. In aircraft spotting training apparatus, aircraft identification boxes for use in connection with a distant scenery screen comprising a box enclosing a flashlight controlled by the instructor, one side of said box being made of window glass lightly painted or sprayed on the outside to blend into the surrounding scenery when said box is built into the screen so that the surface of the glass is substantially flush with said screen, the other side of the glass being sandblasted and covered with an opaque material except for the portion representing the shape and appearance of some particular aircraft.

9. In aircraft spotting and gunnery practice apparatus, a mechanism mounted in back of a distant scenery screen about a cut-out portion therein backed by a backdrop to complete the scenery in that portion including an irregular track mounted about said cut-out, one or more trolleys mounted to follow said track, a rod fixed to each of said trolleys so as to extend inwardly of said track, an aircraft model removably mounted on the end of said rod, said track being of such form as to cause the model to enter the cut-out portion and follow an irregular curve in front of the backdrop during portions of the journey of the trolley, and means for driving said trolleys slowly along said track to cause said models to consecutively appear and disappear from the student's view.

EDMUND O. CARMODY.